May 8, 1945.  E. C. HOKANSON  2,375,363
PROPELLER DOLLY
Filed Nov. 4, 1942  2 Sheets-Sheet 1
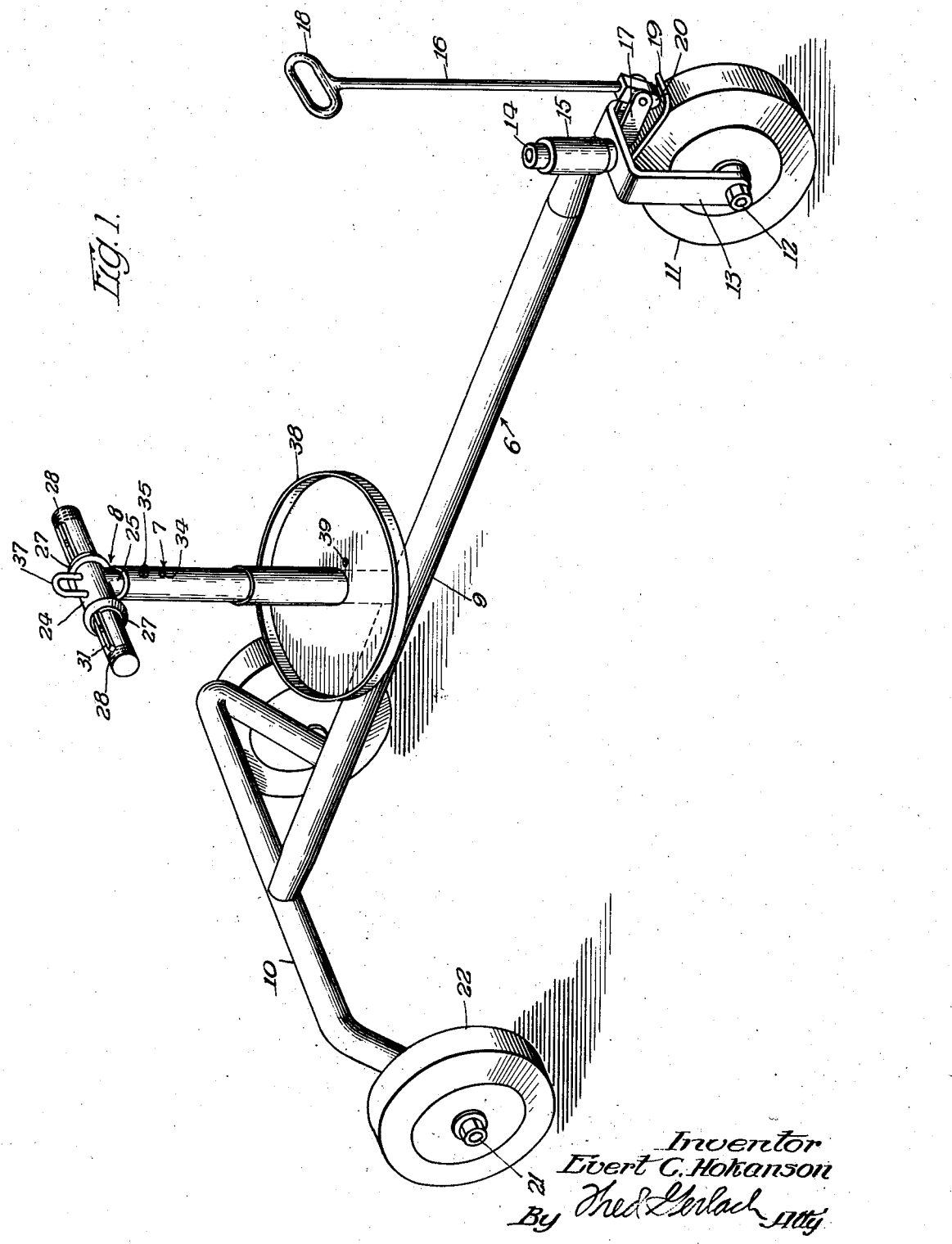

May 8, 1945.   E. C. HOKANSON   2,375,363
PROPELLER DOLLY
Filed Nov. 4, 1942   2 Sheets-Sheet 2
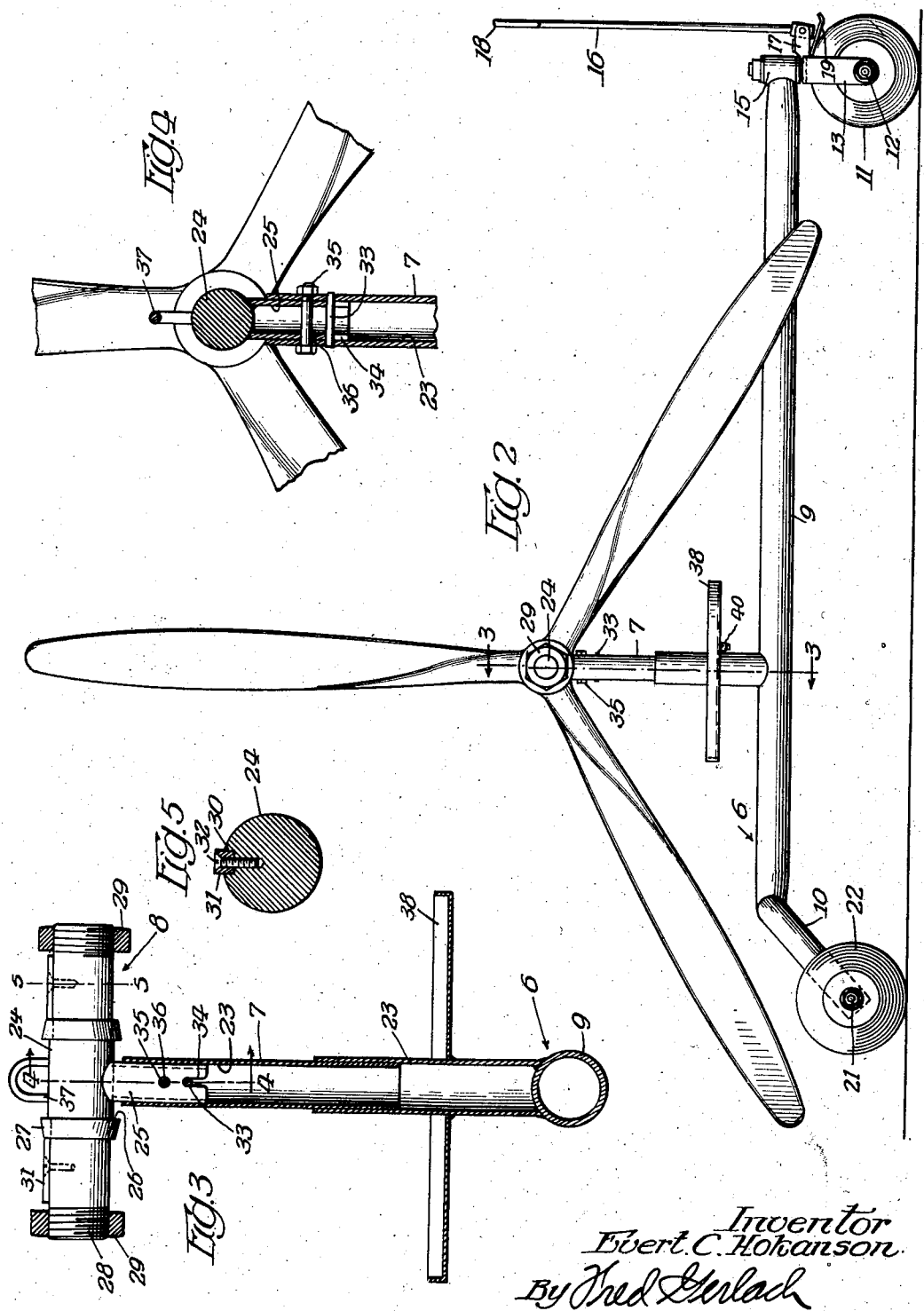
Inventor
Evert C. Hokanson
By Fred Gerlach
Atty.

Patented May 8, 1945

2,375,363

UNITED STATES PATENT OFFICE 2,375,363

PROPELLER DOLLY

Evert C. Hokanson, Los Angeles, Calif., assignor to Whiting Corporation, Harvey, Ill., a corporation of Illinois Application November 4, 1942, Serial No. 464,493

5 Claims. (Cl. 211—13)

The present invention relates to dollies. More particularly the invention relates to that type of dolly which is designed to carry or support airplane propellers and serves as a medium for transporting the propellers thereon from place to place.

One object of the invention is to provide a propeller dolly which is an improvement upon, and has certain advantages over, previously designed dollies for the same purpose and is characterized by the fact that it is readily maneuverable in congested spaces, facilitates changing propellers on an airplane and provides a safe and easy means for transporting propellers to and from storage racks or a service shop.

Another object of the invention is to provide a propeller dolly of the type under consideration which comprises a wheel equipped frame having a standard thereon and in addition a fitting embodying a horizontal part with the ends thereof shaped to fit within the hubs of a pair of propellers and a depending vertical part in telescopic relation with the upper end of the standard.

Another object of the invention is to provide a propeller dolly of the last mentioned character in which the fitting is of the T variety and has an upstanding eye at the central portion or mid point of the horizontal propeller supporting part so that it may be attached to a hoist in connection with mounting and removal of the fitting with respect to the standard on the wheel equipped frame.

A further object of the invention is the provision in connection with a dolly of the type and character under consideration of releasable means for locking the T fitting to the standard and also means for controlling the T fitting during assembly or mounting thereof with respect to the standard so that it assumes a position wherein the horizontal part of the fitting extends transversely with respect to the wheel equipped frame.

A still further object of the invention is to provide a propeller dolly which is generally of new and improved construction and consists of but a comparatively small number of parts and in which compactness and simplicity of design are combined with cheapness of construction and durability.

Other objects of the invention and the various advantages and characteristics of the present propeller dolly will be apparent from a consideration of the following detailed description.

The invention consists in the several novel features which are hereinafter set forth and are more particularly defined by claims at the conclusion hereof.

In the drawings which accompany and form a part of this specification or disclosure and in which like numerals of reference denote corresponding parts throughout the several views:

Figure 1 is a perspective of a dolly embodying the invention;

Figure 2 is a side view of the dolly showing the manner in which the removable T fitting on the frame supported standard serves as a propeller supporting medium;

Figure 3 is an enlarged vertical transverse section taken on the line 3—3 of Figure 2 and showing the design and construction of the propeller supporting T fitting and the manner in which the depending vertical part thereof is telescopically connected to the upper end of the standard;

Figure 4 is a vertical longitudinal section taken on the line 4—4 of Figure 3 and showing in detail the releasable means for locking the T fitting to the standard and also the means for locating the T fitting so that it assumes a transverse position with respect to the frame when it is shifted downwards in connection with attachment of the fitting to the standard; and Figure 5 is an enlarged cross section on the line 5—5 of Figure 3.

The dolly which is shown in the drawings constitutes the preferred form or embodiment of the invention. It is designed to carry or support a pair of multi-bladed airplane propellers and comprises as its main or principal parts a three wheel frame 6, a standard 7, and a T fitting 8.

The frame 6 embodies a main horizontal longitudinally extending member 9 and an inverted U-shaped member 10 at the rear end of the main member. The front end of the frame is supported by a single dirigible wheel 11. This has an axle 12 and is connected to the front end of the main longitudinally extending member 9 of the frame 6 by way of an inverted U-shaped bracket 13 and a spindle 14. The bracket is positioned in straddled relation with the dirigible front wheel 11 and has the lower ends of the side pieces thereof connected to the ends of the axle 12. The spindle 14 is connected to, and projects upwardly from, the central portion of the cross piece of the bracket 13 and is journaled in a cylindrical upstanding bearing 15 on the front end of the main member 9 of the frame. It is suitably held against vertical displacement relatively to the bearing and serves to permit the wheel to rotate or swivel about a vertical axis. In order to permit the dolly to be pulled from place to place the frame is provided at the front end thereof with a pull rod 16. One end of this rod is disposed between, and pivotally connected to, the outer ends of a pair of laterally spaced horizontally extending lugs 17 and the other end embodies a handle 18 for gripping purposes. The inner ends of the lugs are fixedly connected to the under side of the cross piece of the inverted U-shaped bracket 13. The pivotal connection between said one end of the pull rod 16 and the lugs 17 permit the pull rod to swing vertically. The two lugs 17 are arranged in parallel relation with the front wheel 11 and so connect the pull rod to the bracket 13 that the wheel 11 may be swung or steered by sidewise manipulation of the pull rod. A brake 19 in the form of a strip of spring metal underlies the lugs 17, as shown in Figure 1 and has one end thereof suitably anchored to the under side of the cross piece of the bracket 13. The outer end of the brake overlies the wheel 11 and is adapted when depressed to grip the wheel frictionally and to prevent rotation thereof about its axle 12. The end of the pull rod that is pivotally connected to the lugs 17 is provided with a cam 20 and this is adapted when the pull rod is swung upwards and rearwards into a substantially vertical position, to engage the free end of the brake 19 and shift it downwards into braking relation with the wheel. When the pull rod is swung forwards and downwards in connection with pulling of the dolly the cam 20 swings out of engagement with the free end of the brake and releases the brake so that it springs upwards into its inoperative or wheel releasing position. The inverted U-shaped member 10 of the frame 6 extends at right angles to the main longitudinally extending member 9 and has the central portion of its cross piece welded or otherwise fixedly secured to the rear end of said main member 9. Preferably the members 9 and 10 are formed of pipes. The lower ends of the side pieces of the member 10 are provided with outwardly extending stub axles 21 and these are axially aligned and have ground wheels 22 mounted thereon. The dirigible wheel 11 and the wheels 22 are preferably the same in diameter and permit the dolly to be wheeled from place to place as desired.

The standard 7 of the dolly is rigidly connected to, and projects upwardly from, the central portion of the main longitudinally extending member 9 of the frame 6. It is in the form of a pipe and extends vertically. The upper end of the standard is open and defines an open top vertically extending socket 23. The lower end of the standard is preferably welded to the subjacent portion of the main longitudinally extending member 9 of the frame 6.

The T fitting 8 serves as the medium for carrying or supporting the two propellers and is removably connected to the upper end of the standard 7 as hereinafter described. It is of unitary construction and comprises a solid horizontally extending part 24 and a depending vertically extending part 25. The horizontally extending part 24 is cylindrical and has the ends thereof of reduced diameter and shaped to fit within the hubs of the propellers. Annular shoulders 26 are formed between the central portion of the horizontal part 24 of the T fitting and the inner portions of the propeller supporting ends of the part 24 and these shoulders form stops for a pair of tapered abutment-forming collars 27 which are mounted on said inner portions of the ends of the part 24 and are adapted to receive the inner portions of the propeller hubs. The outer extremities of the propeller supporting ends of the horizontal part 24 of the T fitting 8 have male screw threads 28 and these are adapted to receive nuts 29 for clamping the propeller hubs against the tapered collars 27. Each end of the part 24 is provided in the upper portion thereof with a longitudinal keyway 30 for a key 31. The two keys are adapted to fit within the keyways in the propeller hubs and serve to prevent rotation of the propellers when they are in place on the T fitting 8. They are longitudinally aligned and are secured in place by means of screws 32. The inner ends of the keys abut against the outer ends of the tapered collars 27 and serve to hold the collars in place against the annular shoulders 26. The outer ends of the keys terminate inwardly of the male threads 28 on the outer extremities of the propeller supporting ends of the fitting part 24. In connection with use of the dolly the nuts 29 are removed from the screw threads 28 and the hubs of the propellers are slid inwards onto the ends of the part 24 until the inner ends thereof abut against the tapered collars 27. During mounting of the propeller hubs on the ends of the part 24 the hubs are adjusted so that certain of the keyways therein are in position slidably to receive the keys 31. After shift of the propellers into place the nuts 29 are mounted on the outer extremities of the part 24 so that they serve, together with the tapered collars, to hold the propellers against axial displacement with respect to the horizontal part 24 of the fitting. The depending vertically extending part 25 of the fitting is disposed beneath the mid point of the part 24. It is shaped to fit within the open top socket 23 in the upper end of the standard 7 and has the upper end thereof welded to the bottom of the central portion of the part 24. When the T fitting is in its operative position it extends at right angles to the main horizontally extending member 9 of the frame 6, as shown in Figure 1. In such position it serves to support the two propellers so that one is at one side of the main member 9 and the other is at the other side of such member. The depending part 25 of the T fitting fits slidably within the socket 23 and hence the fitting, together with the propellers thereon, may be lifted from the standard either in connection with use thereof or when it is desired to mount the fitting on a storage standard having a standard like the standard 7 of the dolly. A cross pin 33 extends across the upper end of the standard 7 and serves to limit downward movement of the fitting part 25 in the socket 23. This pin extends diametrically across the standard and is disposed in parallel relation with the main horizontally extending member 9 of the frame 6. The lower end of the depending vertically extending part 25 of the T fitting is provided with a pair of diametrically opposite notches 34 for receiving the pin. These notches extend at right angles to the horizontal part 24 of the fitting and have flared lower ends so as to facilitate entry of the cross pin 33 into the notches when the T fitting is mounted on the standard. The cross pin and notches prevent rotation of the T fitting relatively to the standard and in addition serve so to locate the fitting that when the latter is mounted in place the horizontal part 24 extends transversely of the frame 6. In order releasably to lock the fitting to the standard a bolt 35 is provided. This bolt, as shown in Figure 4, is adapted to extend through aligned holes 36 in the depending part 25 of the T fitting and the upper end of the standard. The holes in the standard are arranged so that when the T fitting is in its proper assembled position with respect to the standard they register with the holes in the fitting part 25. When it is desired to lock the fitting to the standard the bolt 35 is employed. When it is desired to release the fitting so that it may be removed from the standard the bolt 35 is removed. The bolt constitutes simple means for releasably locking the T fitting to the standard. In order to facilitate removal of the T fitting from the standard the central portion of the horizontally extending part 24 of the fitting is provided with an upstanding eye 37. This eye is fixedly secured to the fitting part 24 and permits an overhead hoist to be applied to the fitting. When the fitting is free as the result of removal of the bolt 35, the eye may be used in connection with removal of the fitting and any propellers thereon from the standard, and when the fitting is locked to the standard by the bolt the eye may be utilized in conjunction with a hoist to move the entire dolly from place to place.

In addition to the aforementioned parts the dolly comprises a circular pan 38 on the lower portion of the standard 7. This pan has a central hole through which the standard extends and is welded or otherwise fixedly secured in place. It is adapted to catch any oil that may drip from the propeller hubs and has a drain hole 39 which is normally closed by a screw plug 40. As shown in Figure 3, the diameter of the pan is greater than the length of the horizontal part 24 of the T fitting and hence the side portions of the pan project outwards of the propeller hubs and serve to protect the hubs. The pan functions not only as a medium for catching oil and protecting the propellers but also as a support on which the nose pieces of the propeller hubs may be placed when the propellers are supported on the T fitting 8.

When it is desired to use the dolly the nuts 29 are removed and the propellers are mounted on the ends of the horizontally extending part 24 of the T fitting as hereinbefore described. While the propellers are mounted in place on the T fitting they may be transported from place to place by pulling the dolly by way of the pull rod 16. When the pull rod is to be used for dolly pulling purposes it is swung forwards and this releases the brake 19. When the dolly is pulled to its destination the pull rod is swung upwards in an out of the way position and this automatically effects application of the brake 19 and locking of the dolly against movement. In the event that it is desired to remove the propellers from the dolly while they are in connected relation with the T fitting 8 the bolt 35 is removed and the operative end of a hoist is applied to the eye 37. Thereafter the hoist is actuated so as to lift the T fitting from the standard 7 on the frame 6. When the propellers are mounted on the dolly they are held against rotation relatively to the T fitting by the keys 31 and are held against turning bodily relatively to the standard by the cross pin 33.

The herein described propeller dolly consists of but a comparatively small number of parts and hence may be manufactured or produced at a low cost. It is readily maneuverable in congested spaces and provides safe and easy means for transporting propellers from place to place. Due to the construction and design of the T fitting 8 the propellers may be removed as a unit from the standard 7. In addition to ready maneuverability the dolly is characterized by compactness and durability.

Whereas the propeller supporting unit comprising the frame, standard and T fitting has been described as a dolly it is to be understood that it may be used without wheels as a work stand. It is also to be understood that the invention is not to be restricted to the details set forth since these may be modified within the scope of the appended claims without departing from the spirit and scope of the invention.

Having thus described the invention what I claim as new and desire to secure by Letters Patent is:

1. A propeller supporting unit comprising an elongated base frame, a standard fixedly connected to, and extending upwards from, the central portion of the frame, a fitting mounted on the upper end of the standard and including an elongated horizontally extending part having the ends thereof projecting in opposite directions from the standard and at right angles to the frame, shaped to receive and support the hubs of a pair of airplane propellers, and provided on the inner portions thereof with outwardly tapered abutment-forming members for receiving the inner portions of the propeller hubs and at their outer extremities with male screw threads, and nuts mounted on the screw threads and serving when tightened while the propellers are in place on the ends of said horizontally extending part to clamp the propeller hubs against said members.

2. A unit adapted to support an airplane propeller and comprising a base frame with a standard thereon, a removable fitting at the upper end of the standard embodying a horizontal cantilever-type part shaped to receive the hub of the propeller and provided on the inner portion thereof with an outwardly tapered abutment for receiving the inner portion of the propeller hub and at its outer extremity with releasable means for clamping the propeller hub against said abutment, and also embodying a vertical depending part connected telescopically to the standard, and releasable means for locking the fitting to the standard.

3. A dolly designed to support a pair of airplane propellers and comprising a wheel equipped base frame with a standard thereon, a removable fitting positioned normally on the upper end of the standard and embodying an elongated horizontally extending part having the ends thereof shaped to receive the hubs of the propellers and provided on the inner portions thereof with outwardly tapered abutment forming members for receiving the inner portions of the propeller hubs and at their outer extremities with releasable means for clamping the propeller hubs against said abutment forming members, and also embodying a vertically extending part connected to, and depending from, the central portion of the horizontally extending part and connected telescopically to said upper end of the standard, and releasable means for locking the fitting to the standard.

4. A unit designed to support a pair of airplane propellers and comprising an elongated horizontal frame, a standard connected to, and projecting upwards from, the central portion of the frame and having a longitudinal open top cylindrical socket in its upper end, a removable T type fitting normally mounted on said upper end of the standard and embodying an elongated horizontal part having the ends thereof shaped to receive the hubs of the propellers and provided on their inner portions with outwardly tapered abutments for receiving the inner portions of the propeller hubs and at their outer extremities with releasable means for clamping the propeller hubs against said abutments when the propellers are on the ends of said horizontal part, and also embodying a cylindrical vertical part connected to, and depending from, the central portion of the horizontal part and shaped to fit slidably within the socket, and a pin and notch connection between the standard and said vertical part of the fitting for maintaining the fitting when it is mounted on the standard in a position wherein the horizontal part thereof extends transversely of the frame.

5. A unit designed to support an airplane propeller and comprising a base frame with a standard thereon, a fitting on the upper end of the standard including a cantilever part shaped to receive the propeller hub and provided at its inner end with an outwardly tapered abutment-forming member for receiving the inner end of the propeller hub and at its outer extremity with a male screw thread, and a nut mounted on the screw thread, and serving when tightened while the propeller is in place on the cantilever-type part to clamp the hub of the propeller against said member.

EVERT C. HOKANSON.